Figure 1:
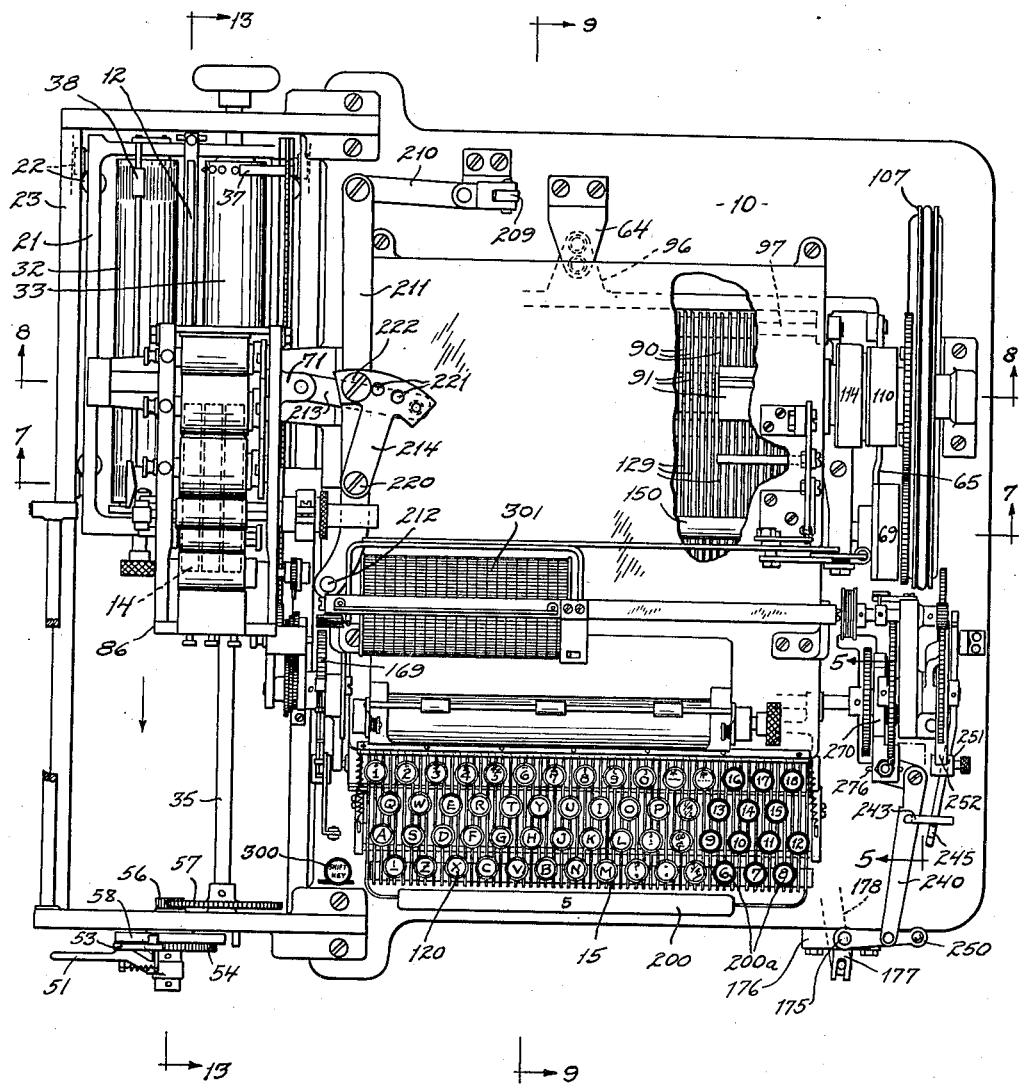

July 11, 1939.   C. CHISHOLM   2,165,224
TYPEWRITING MACHINE
Filed Nov. 10, 1936   9 Sheets-Sheet 1

INVENTOR.
Clifton Chisholm
BY
Bates, Golnick & Tear
ATTORNEYS.

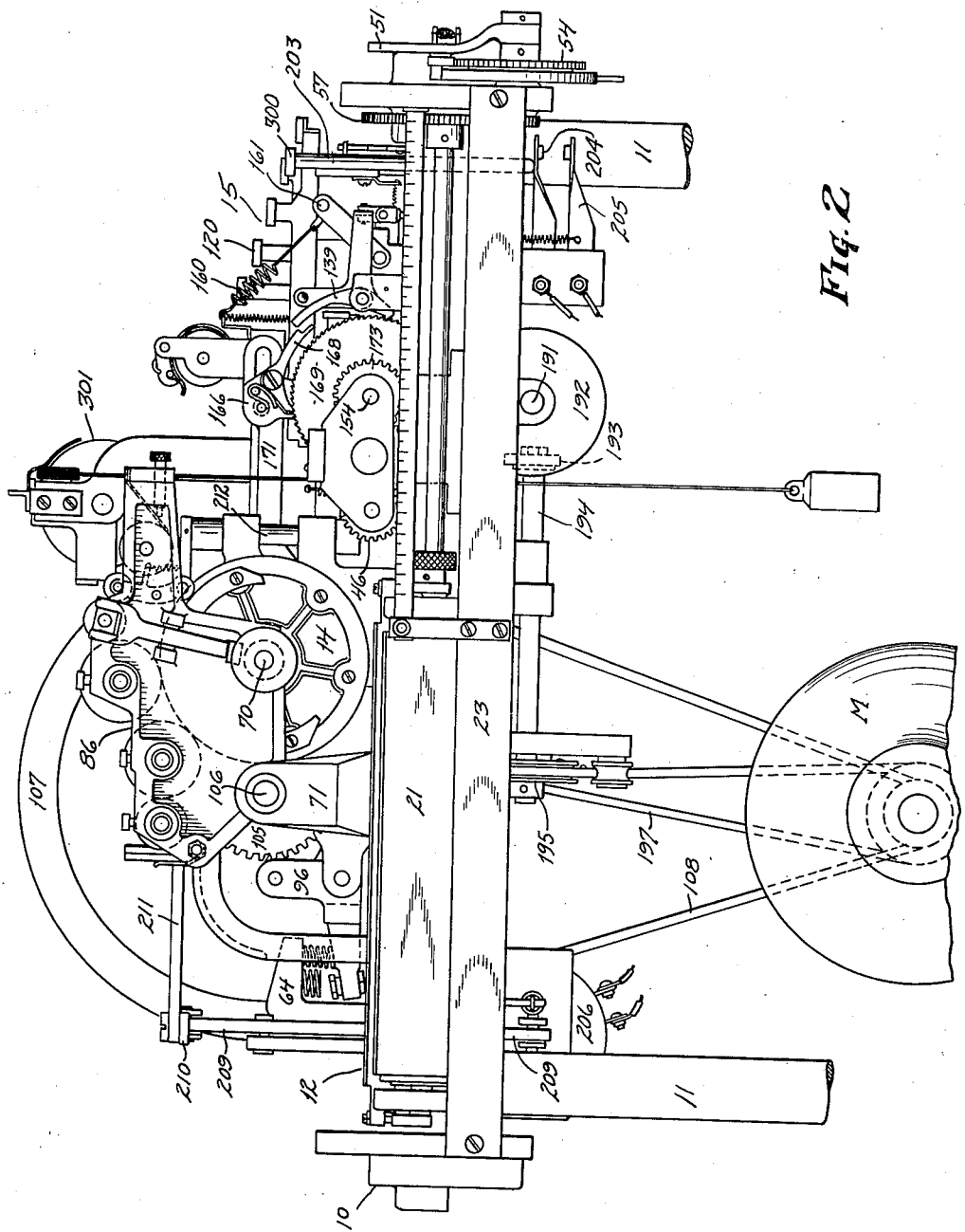

July 11, 1939.　　　　C. CHISHOLM　　　　2,165,224
TYPEWRITING MACHINE
Filed Nov. 10, 1936　　　9 Sheets-Sheet 3
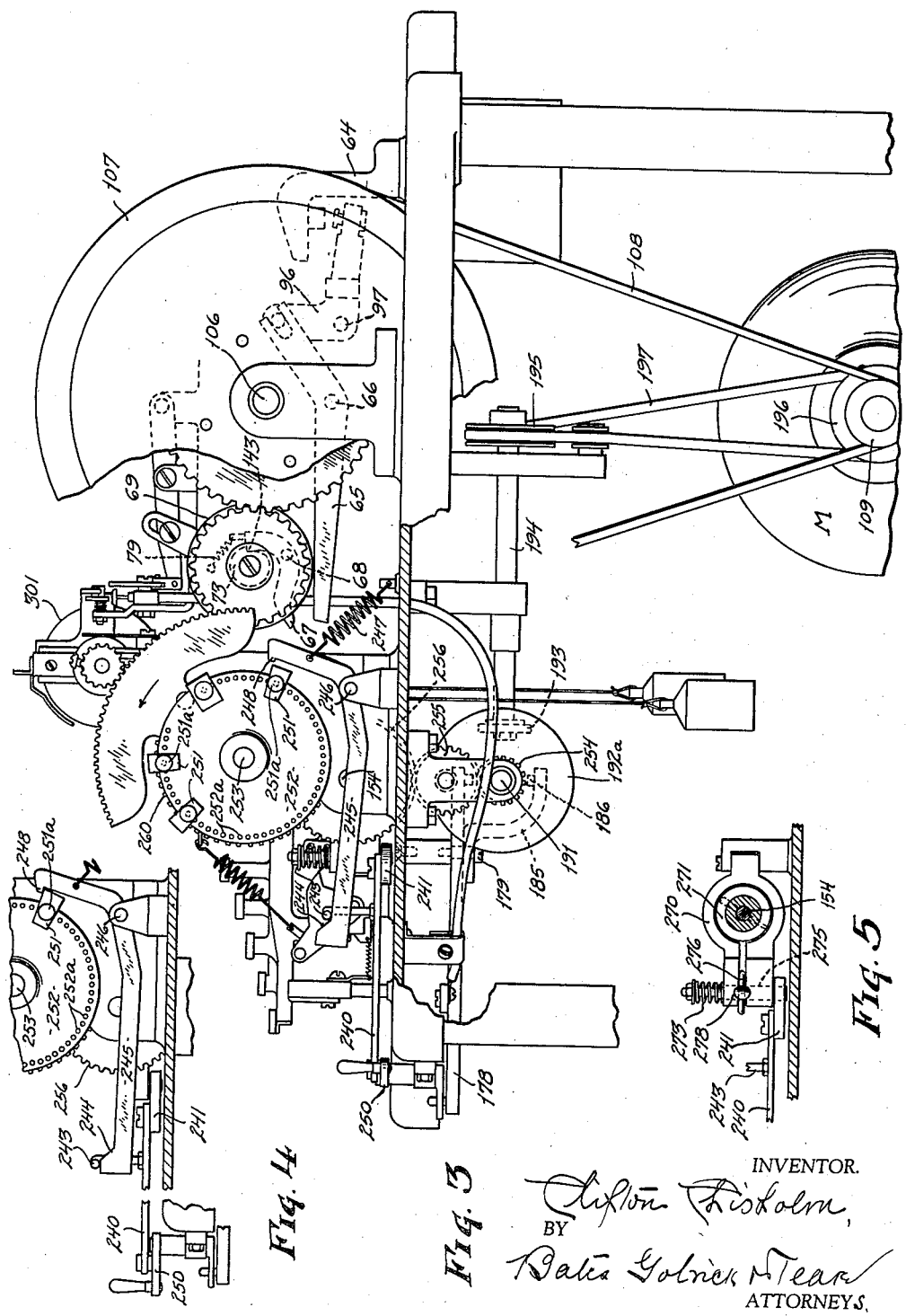
INVENTOR.
Clifton Chisholm,
BY
Bates Golrick & Tear
ATTORNEYS.

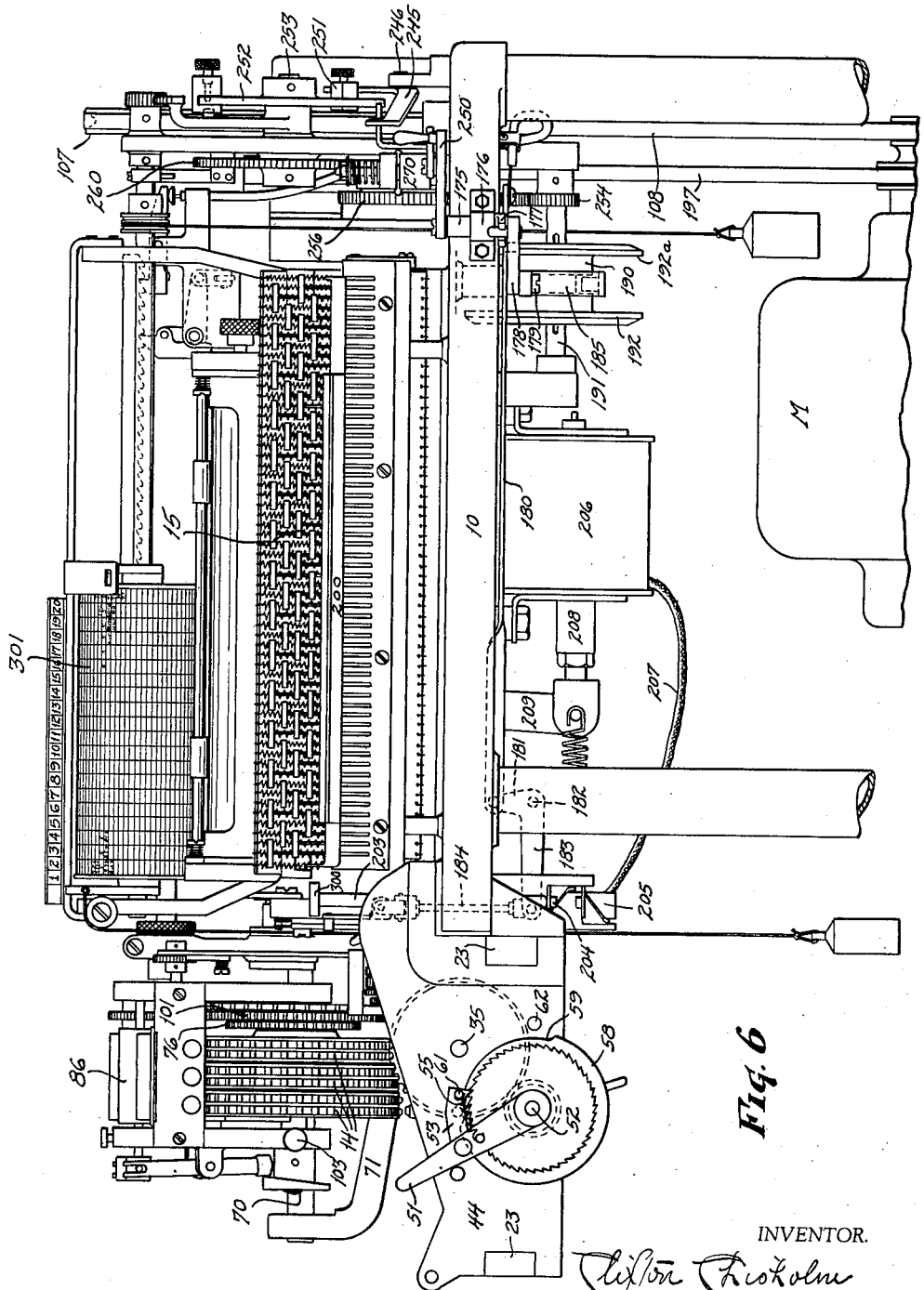

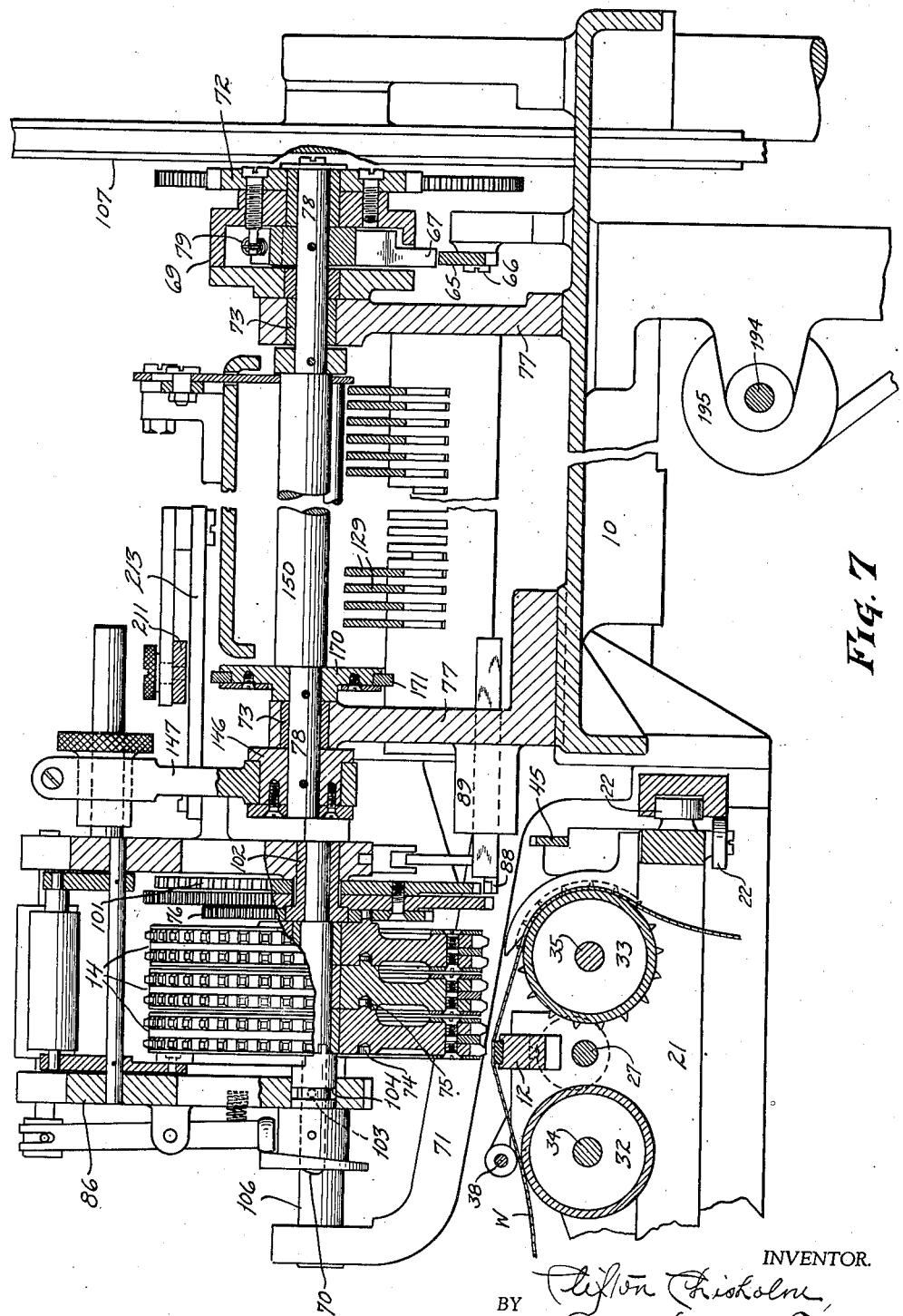

July 11, 1939.    C. CHISHOLM    2,165,224
TYPEWRITING MACHINE
Filed Nov. 10, 1936    9 Sheets-Sheet 6

INVENTOR.
Clifton Chisholm,
By Daley, Gobrick & Fearn
ATTORNEYS.

July 11, 1939.                C. CHISHOLM                2,165,224
                          TYPEWRITING MACHINE
                     Filed Nov. 10, 1936          9 Sheets-Sheet 7

INVENTOR.
Clifton Chisholm,
BY Bates, Goldrick & Teare
ATTORNEYS

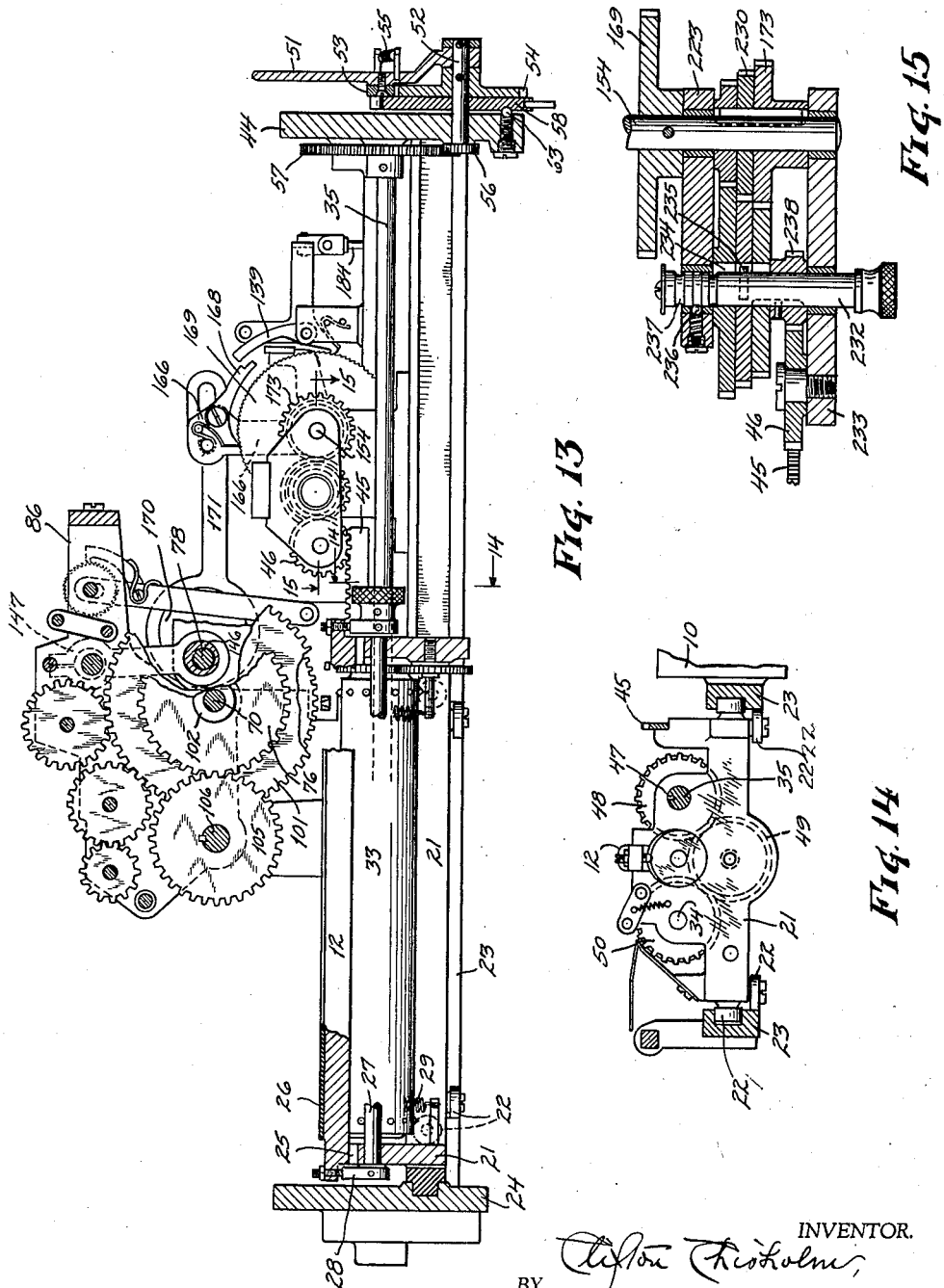

July 11, 1939.  C. CHISHOLM  2,165,224
TYPEWRITING MACHINE
Filed Nov. 10, 1936  9 Sheets-Sheet 9

INVENTOR.
BY Clifton Chisholm
Bates, Goldrick & Fearn
ATTORNEYS

Patented July 11, 1939

2,165,224

UNITED STATES PATENT OFFICE 2,165,224

TYPEWRITING MACHINE

Clifton Chisholm, Cleveland Heights, Ohio

Application November 10, 1936, Serial No. 110,085

5 Claims. (Cl. 197—18)

This invention relates to a printing or typewriting machine of the keyboard type for the production of copy for subsequent reproduction in quantities. The present invention is a continuation in part of my copending application for Letters Patent, filed February 5, 1936, and assigned Serial No. 62,467. It is the general object of the present invention to provide an improved keyboard operated typing mechanism for a printing machine to enable the operator to produce a clear, distinct and justified copy, which may be utilized in a reproducing process other than letter-press printing, for producing copies in simulation of letter-press printing. Such reproduction, for instance, may be accomplished planographically, hectographically or by stencil, but is preferably accomplished by photographic transfer to a printing plate which is used in an offset planographic printing machine.

A further object of the present invention is the provision of a typewriter utilizing characters of different widths, similar to printer's type.

Another object of this invention is the provision of an improved key-operating mechanism for use with type of varying widths, which mechanism is arranged and adapted to control, not only the selection of the specific type to be impressed, but also to control the advance of a paper carriage in such a manner as to cause the distance of such advance to be equal to that required for the selected character.

A further object of the present invention is to provide a printing machine of the keyboard type with an improved operating mechanism, which will be operated by suitable power mechanism and will be so arranged as to minimize the work done by the keys themselves, thereby increasing the speed and accuracy of the mechanism.

Other objects of the invention will become more apparent from the following description, reference being had to the accompanying drawings, in which I illustrate a preferred embodiment of the invention. The essential characteristics of the invention will be summarized in the claims.

Figure 8:
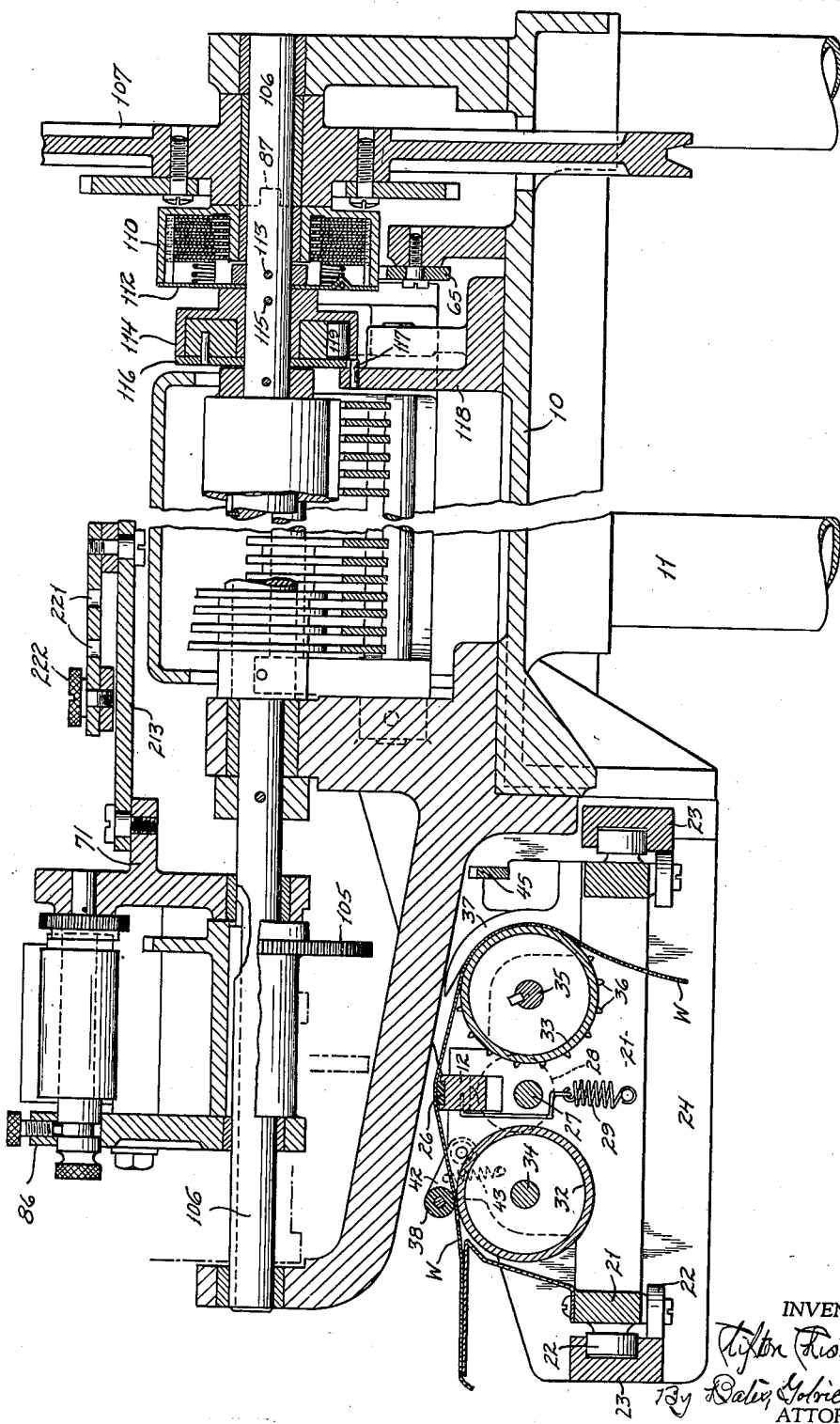
Figure 9:
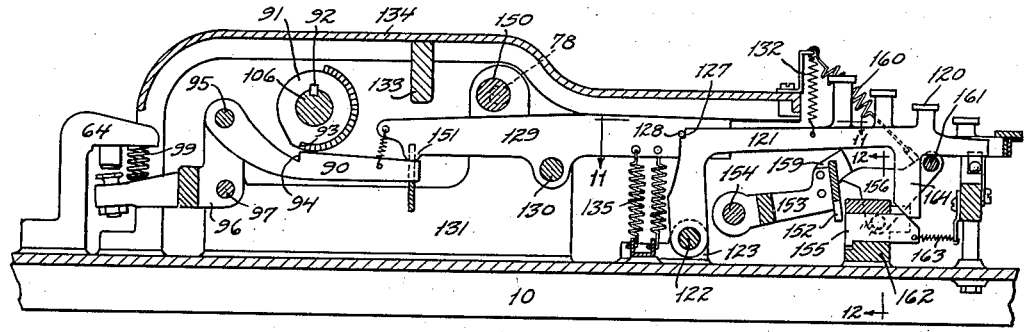
Figure 10:
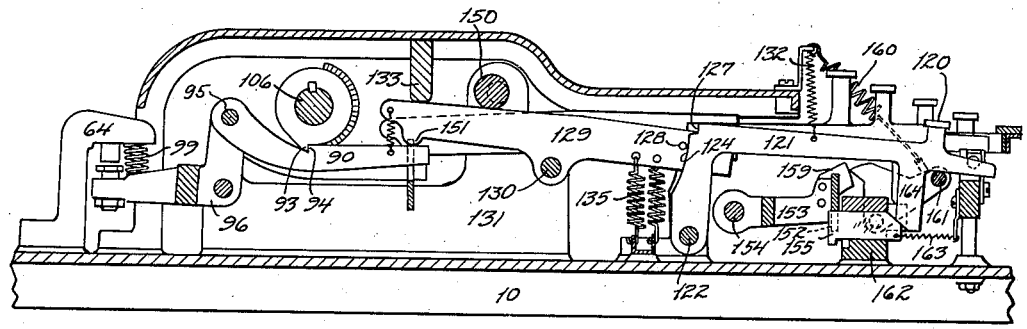
Figure 11:
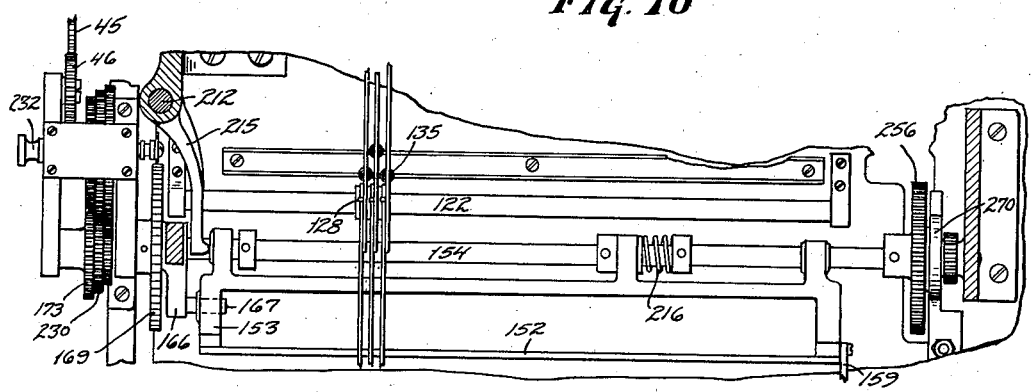
Figure 12:
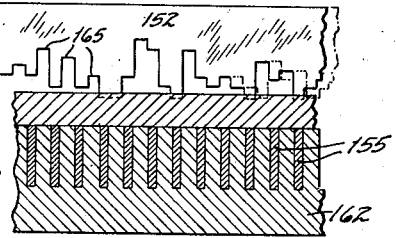
Figure 16:
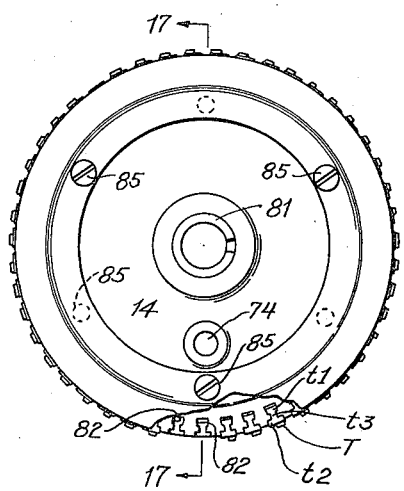
Figures 17, 18:
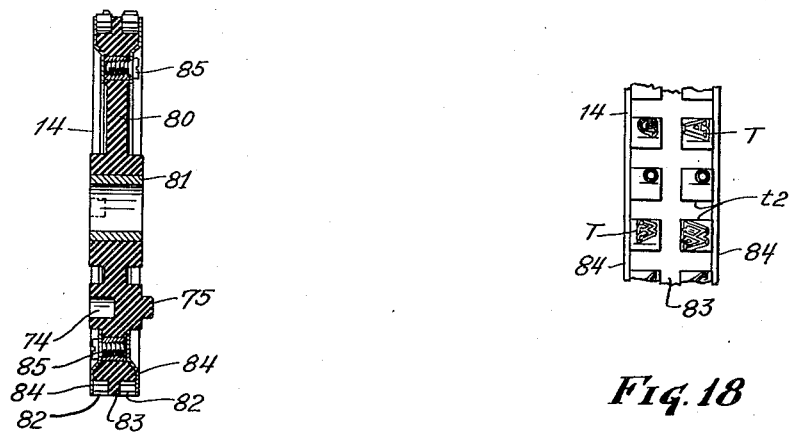

In the drawings, Fig. 1 is a plan view of a machine embodying my invention; Fig. 2 is a side elevation looking at the left-hand side of Fig. 1; Fig. 3 is a side elevation looking at the machine from the right-hand side of Fig. 1, certain parts being broken away to more clearly illustrate the mechanism; Fig. 4 is a detail illustrating certain of the parts shown in Fig. 3, in different positions; Fig. 5 is a sectional detail, the plane of the section being indicated by the lines 5—5 on Fig. 1; Fig. 6 is a front elevation of the machine illustrated in Fig. 1; Figs. 7 and 8 are transverse sectional views on an enlarged scale, the plane of the sections being indicated by the lines 7—7 and 8—8 on Fig. 1; Fig. 9 is a longitudinal sectional view, as indicated by the line 9—9 on Fig. 1; Fig. 10 is a view similar to Fig. 9, but illustrating certain of the parts in a different position; Fig. 11 is a fragmentary horizontal section, the plane of the section being indicated by the line 11—11 on Fig. 9; Fig. 12 is a detail section as indicated by the line 12—12 on Fig. 9; Fig. 13 is a vertical section taken in the plane of the lines 13—13 on Fig. 1; Fig. 14 is a sectional detail as indicated by the line 14—14 of Fig. 13; Fig. 15 is a sectional detail, the plane of the section being indicated by the line 15—15 on Fig. 13; Fig. 16 is a side elevation of a type wheel removed from the machine; Fig. 17 is a section as indicated by the line 17—17 on Fig. 16; Fig. 18 is a fragmentary face elevation of a type wheel.

Referring now to the drawings, and especially to Figs. 1 and 2, it will be seen that my improved typewriting machine comprises a frame 10, supported by suitable legs or standards 11 and carrying a platen 12, across which a work sheet or web may be fed by a suitable paper feeding mechanism. Above the platen 12 are mounted a series of type wheels 14, each wheel carrying on its periphery an entire font of type. One wheel may carry, for instance, an eight-point type, and another wheel a ten-point type, etc. The type wheels are arranged to be selectively positioned to enable the printing from a selected font of type, as explained in detail in my copending application, heretofore referred to.

The type wheel which is in position immediately above the platen is rotated under control of a key board 15, to bring the desired character or type of its font into printing position. The key board 15 also controls a mechanism which, when a type wheel has been brought to rest with the selected character in printing position, causes the wheel to move bodily, bringing the selected type thereon into printing contact with the work.

After the character has been impressed on the work, the latter is advanced a distance which is determined by the width of the character impressed. The total advance of the work, as well as the total number of spaces between the words of a set line, control the positioning of a justifying scale carried by a drum 201 mounted on the frame. This justifying scale, its operating mechanism, together with the method of using the same, forms the subject matter of my copending application, heretofore referred to. Briefly, the mechanism is such that when the operator types a line using a standard space bar 200, this mechanism actuates the chart to cause it to inform the operator which one or ones of a series of justifying space keys 200a should be used, in retyping the line, to produce a justified line. For a more complete description of this mechanism, reference may be had to my copending application, Serial No. 62,467.

The platen 12 and paper feed mechanism are best illustrated in Figs. 1, 2, 7, 8, 13 and 14. As there shown, the paper feed mechanism and the platen are mounted in a rectangular frame 21, which is provided with guiding rollers 22, arranged to coact with longitudinally extending horizontal guideways 23, supported by a pair of brackets 24 and 44, secured to the main frame 10 at the left-hand side thereof.

As illustrated, the platen comprises a longitudinally extending bar, which is mounted in vertical guideways or slots 25, so that it may be adjusted up and down to regulate the printing pressure and to facilitate the positioning of the paper or work W in the feeding mechanism. The platen is provided with a rubber or similar platen surface 26, which is secured to the platen 12 in the usual manner.

The vertical adjustment of the platen is accomplished by the rotation of a shaft 27, which carries at its opposite end cams 28, arranged to coact with adjusting screws 29 carried by the platen, as shown in Fig. 13. Suitable springs 29, interposed between the platen and the frame 21, maintain the platen in engagement with the cams 28. The adjusting screws serve to regulate the printing pressure, whereas the cams serve to move the platen a considerable distance away from the type wheels 14, which are located thereabove, to permit the initial feeding of a worksheet W to the paper-feeding mechanism.

The paper-feeding mechanism comprises a pair of rolls 32 and 33, mounted on respective shafts 34 and 35, which are journalled in the platen frame. The roll 35 is provided with a plurality of radially extending projections 36, arranged to engage suitable perforations formed in the edges of the worksheet W, so as to accurately position the paper relative to the platen and previously typed lines. As shown in Fig. 8, the worksheet passes around the roll 33 and is maintained in engagement with the projections 36 thereof by guides 37.

The worksheet passes from the roll 33 across the platen 12 to the roller 32 with which it is held in contact by rollers 38. Suitable springs 43, which act on roll supporting levers 42, serve to maintain the rollers 38 in engagement with the work W, as shown in Fig. 8.

The platen bar 26 lies above the top surface of the paper feed rolls 32 and 33, and is of sufficient width to accommodate but one letter. The worksheet W therefore passes upwardly from the roll 33 to the platen and downwardly to the roll 32. Hence, I may place the circumferential rows of printing characters relatively close together without danger of smudging the worksheet.

The mechanism is arranged to type lines of printing characters in a direction parallel with the platen, that is, from the front to the rear of the machine. The platen carriage, together with the paper feed mechanism, just described, is therefore movable lengthwise of the platen in its guideways 23, and is advanced for character feeding in the direction of the arrow of Fig. 1. As shown in Figs. 1, 18 and 13, the paper feed carriage 21 is provided with a rack 45. This rack is engaged by a pinion 46, mounted on the main frame 10 and periodically rotated predetermined angular distances to advance the carriage to the right (Fig. 13), for letter or character feeding of the paper. The return of the carriage is accomplished, as will be hereinafter more fully described, by reversing the direction of rotation of the pinion 46.

The worksheet is advanced to feed it from one printing line to another by a manual operation, which rotates the paper feed rolls 32 and 33, (Fig. 8) in a counter-clockwise direction a distance equivalent to the desired spacing of lines. As shown in Figs. 13 and 14, the feed roll shaft 35 extends the full length of the frame bracket 24, which supports the platen carriage guideway 23, and is provided with a key-way 47, which, together with a key carried by the roll 33, provides in effect a splined driving connection between the shaft 35 and the roll 33.

The roll 32 is driven from the roll 33. Secured to the roll 33 is a pinion 48, which meshes with an idler pinion 49, carried by the carriage 21, and which, in turn, engages a pinion 50, secured to the roll 32.

The shaft 35 is rotated to advance the work W manually by the operator. For this purpose, a lever 51 is pivoted to the bracket 44, as on a pivot shaft 52, and is provided with a pawl 53 normally held in engagement with a ratchet 54 by a suitable spring 55. The clockwise movement of this lever (Fig. 6) causes a partial rotation to be imparted to the ratchet, which is drivingly connected, as shown in Fig. 13, with a pinion 56, which meshes with a gear 57, secured to the forward end of the paper feed roll shaft 35.

The spacing between the lines is controlled by the amount of movement imparted to the ratchet. As illustrated in Figs. 6 and 13, I journal a cam disc 58 on the pivot shaft 52. This cam disc is provided with a recess portion 59, and a high or cam portion 60, which latter portion is arranged to engage a pin 61, carried by the pawl 53 and raise the pawl out of engagement with the ratchet. This, therefore, adjusts the effective stroke of the pawl. The actual stroke of the pawl 53 is limited by a pair of pins 62, which are carried by the bracket 44 and project into the path of the lever 51, as indicated on Fig. 6. The cam 58 is retained in any selected position by a spring-pressed ball 63, (Fig. 13), which is mounted in the frame 24 and engages any one of a series of recesses in the cam disc.

The type wheels are best shown in Figs. 2, 6, 7 and 16 to 17. In the present embodiment of the invention I have illustrated three type wheels 14, each of which is mounted on a shaft 70, which is carried by a bracket 71. This bracket is swingably mounted on a shaft 106, which is journalled in the main frame 10. Each type wheel carries on its periphery two annular sets of type. The type in the left-hand band or ring of type shown in Fig. 7 may comprise upper case type, whereas the right-hand band of the same wheel includes the lower case type.

In Fig. 7 I have shown three type wheels. The left-hand type wheel 14 may carry, for instance, eight-point type, the middle type wheel, ten-point type, and the right-hand type wheel b, twelve-point type. One face of each type wheel is provided with a recess 74, and the other face is provided with a pin 75, adapted to engage the corresponding recess of the next adjacent type wheel. The pin 75 of the type wheel furthest to the right, (Fig. 7) engages a similar recess in a gear 76, which is mounted on the shaft 70. Thus, when the gear is rotated the type wheels are rotated in unison therewith. The amount of such rotation is controlled by the keyboard, as will be hereinafter more fully described.

The type wheels may be made of metal, preferably a light metal such as an aluminum alloy, or of "Bakelite", hard rubber or some other similar non-metallic composition. As indicated in Fig. 17, each type wheel comprises a body section 80, provided with a suitable hub bushing 81. The periphery of the type wheel is provided with a series of key slots 82, arranged to receive type T having enlarged feet $t1$ and heads $t2$ joined together by a web $t3$. The slots 82 are arranged to embrace the heads and web of the type. The heads of the type project outwardly from the periphery of the type wheel, as shown in Fig. 16. The type wheel illustrated in the drawings is provided with two series of type retaining slots 82, each of which extend from opposite faces of the wheel toward the center, where they are separated by an annular ring 83, preferably formed integral with the body of the wheel.

The type T are retained against radial movement by their enlarged feet $t1$ and are inserted in the wheel by sliding them axially relative to the wheel. The type are restrained against axial movement by retaining plates 84, which are secured to opposite faces of the type wheel by suitable screws 85.

Ink is supplied to the type wheels by a suitable inking mechanism 86, which is mounted on the type wheel bracket 71. A detailed description of this mechanism is given in my copending application, heretofore mentioned. Suffice it here to say that the mechanism is arranged to maintain the type wheels supplied with the desired supply of ink.

It will be noted from Fig. 7 that the type wheels may be readily removed without disturbing their driving gear 76, or a type wheel registering gear 101, hereinafter to be more fully described. To this end the gears 76 and 101 are mounted on a sleeve 102, carried by the frame bracket 71, and this sleeve, in turn, rotatively supports the shaft 70. Hence, the shaft 70 may be withdrawn without disturbing the gears. The shaft 70 is normally held in operative position by a set screw, indicated at 103, (Figs. 6 and 7), as carried by the left-hand frame member of the bracket 71 and arranged to engage an annular recess 104 in the shaft 70, thereby preventing its axial movement.

The type wheels 14 are normally rotating and are brought to a stop with a selected character in the printing position by the operation of the key board, as will be hereinafter more fully described. As illustrated in Fig. 13, the type wheel driving gear 76 meshes with a gear 105, which has a splined driving connection with the shaft 106, on which the bracket 71 is pivotally mounted. A driving belt 108, (Fig. 3) connects a motor-driven pulley 109, with a pulley 107, which is rotatively mounted on the right-hand end of the shaft 106, as illustrated in Fig. 8.

The pulley 107 is drivingly connected, by a suitable clutch formation 87, with one member 110 of a frictional driving clutch 111, the other member 112 of which is pinned to the shaft 106, as indicated at 113. Back lash of the shaft 106 is prevented by a roller clutch, one member 114 of which is secured to the shaft 106 by a pin 115, and the other member 116 of which is held stationary by a pin 117, carried by a frame bracket 118. This clutch is of the usual type and hence is not described in detail. Suffice it to say that it is of the type wherein, as long as the shaft rotates in one direction, clutch rollers 119 are free to move about the axis of the shaft, but whenever the shaft tends to rotate in the other direction, these rollers lock the two clutch members together, thereby locking the shaft against rotation.

As heretofore mentioned, the type wheel, which is above the platen 12, is brought to rest with a selected type in printing position, that is, immediately above the platen bar or at the lowermost point on the type wheels, so that consequent upon the rocking of the type wheel bracket 71 about the shaft 106, the lowermost type will leave an impression on the work sheet W, which lies across the platen as illustrated in Fig. 8.

The stopping of the rotation of the type wheels is under direct control of keyboard 15. This keyboard and the control mechanism associated therewith is best illustrated in Figs. 1, 2, 3, 6, 7, and 9 to 11, inclusive. Referring specifically to Fig. 1, the keyboard 15 includes a series of character keys 120 which, for illustrative purposes, are outlined on Fig. 1 with a pair of adjacent circles; a standard space bar 200; a series of special space keys 200a, a shift key 300, a tabulator and a carriage return lever 250. The special space keys 200 are outlined with a heavy black circle, to distinguish them from the character keys and are used in place of the standard space bar for justifying the line on retyping of the same, as fully explained in my copending application, heretofore referred to.

The operation of the character keys and the manner in which they control the stopping of the type wheels, will now be described. Each character key 120 is, as shown in Fig. 9, supported by an upstanding arm of a lever 121 of a compound key lever. The levers 121 of all key levers are pivoted to a common shaft 122, mounted in suitable frame brackets 123. The normal position of the key levers 121 is shown by the lever 121 in Fig. 9. Here it will be noted that the key lever 121 is provided with a notch 127, which provides a seat for a pin 128, carried by a lever 129 which forms the other member of the compound key lever. The key levers 129 are pivotally mounted on a common shaft 130 carried in frame brackets 131. The pins 128 are normally maintained in respective notches 127 by springs 132 which are interposed between the levers 129 and a suitable frame member.

The arrangement of the key mechanism is such that the operator need only initiate the depression of a key, power mechanism, operated by the motor M, heretofore described, serving to complete the depression. When the operator depresses a finger key 120, an amount sufficient to cause the notch 127 of its respective key lever member 121 to disengage the pin 128 of its corresponding lever member 129, a spring 135 rocks the lever about its pivot from the position illustrated in Fig. 9 to the position shown in Fig. 10. A suitable stop bar 133, carried by a cover 134, which is secured to the frame 10, limits the movement of the levers 129.

The movement of any one of the levers 129 from the position shown in Fig. 9 to the position shown in Fig. 10 stops the type wheel with the character corresponding to the character represented by such key lever, in printing position.

This movement of the key lever 129 also releases for action a mechanism which causes the type wheels to be rocked about their pivot shaft 106, to cause the selected character to be impressed upon the work W. Likewise, this movement also causes the platen and paper carriage to be advanced a distance equivalent to that required by the selected character, immediately after the impression of such character takes place, thereby positioning the work sheet for the impression of the next succeeding character.

The rocking of any key member 129 stops the type wheels by the operation of a corresponding stop lever 90. As shown in the drawings, and especially Figs. 1, 9 and 10, the shaft 106, which drives the type wheels, is provided with a series of discs 91 which are drivingly secured thereto by a key 92. There is one disc for each key lever mechanism 121, 129, such disc lying in the same vertical plane as the key lever member 129. Each disc 91 is provided with a shoulder 93, and it will be noted from Figs. 8 and 9 that these shoulders 93 hold a different angular position relative to the axis of the shaft 106, such positions being equal to the angular positions of the type about the periphery of the type wheels. Each shoulder 93 is arranged to be engaged by an abutment 94 of its respective stop lever 90. The latter levers are pivoted as at 95 to a bell crank 96, which is, in turn, pivoted to the frame bracket 131, as at 97.

The stops 90 are normally held out of the path of the shoulders of their respective discs 91 by the key lever members 129 heretofore described. When, however, a key 120 is depressed, the corresponding lever 129 is rocked in clockwise direction by its respective spring 135, and causes a spring 98, interconnecting such lever and its respective stop 90, to raise the stop into the path of the shoulder of its respective disc 91. Hence, the rotation of the shaft 106 will be stopped when the shoulder 94 of such disc engages the abutment of the corresponding stop member 94. The friction clutch 111 heretofore described, permits the stopping of the shaft 106 without interference with the operation of the power mechanism or damage to the parts. This stopping of rotation of the shaft 106 stops the type wheel with the selected character in printing position, which character is represented by the key 120 which was depressed.

The depression of the key 120 also releases a mechanism which causes the printing action. As shown in Figs. 9 and 10 it will be noted that when a disc 91 engages a stop lever 90, it rocks the bell crank 96 about its pivot 97, against the action of a compression spring 99 interposed between the bell crank and a stationary frame member 64. The movement of this bell crank rocks a lever 65 (Fig. 3) about its pivot 66, withdrawing the left-hand end of said lever (Fig. 3) from the path of a latch 67, which is pivoted as at 68 to a clutch member 69. This clutch member is drivingly secured to a gear 72 and both the member and the gear are rotatively mounted on a shaft 78, journalled in suitable bearings 73 in upstanding frame bracket members 77.

The withdrawal of the latch 67 permits a spring 79 to draw the latch into engagement with an abutment 143 formed on a collar 144, which is pinned to the shaft 78, thereby drivingly connecting the shaft with the gear 72. This gear meshes with a gear 145, which is drivingly connected to the driving pulley 107. This clutch is of the usual single revolution type, and when the shaft has made one complete revolution, the latch 67 will be cammed out of engagement with the collar 144, by the lever 65, which, at that time, will have been returned to its normal position.

The shaft 78, during the first-half of its revolution, acts to rock the type wheels to cause an impression to be made upon the work sheet W. As shown in Fig. 7, an eccentric bushing 146 is secured to the left-hand end of the shaft 78, and through a connecting rod 147, which is interconnected between the eccentric and a pin 148 integrally carried by the type wheel carriage 71, causes the carriage to be rocked about its pivot shaft 106, thus causing an impression to be made.

The rocking of the carriage 71 to make an impression accurately positions the type which has been moved substantially to the printing position by the key lever mechanism. As illustrated in Figs. 7 and 13, an indexing gear 101 is mounted on the sleeve 102 and, as heretofore explained, is arranged to rotate as a unit with the type wheels. As the carriage is swung downwardly about its pivot, this gear engages a precisioning dog 88 carried by a stationary frame bracket 89. This engagement takes place before the type strikes the work and is effective to accurately index the type wheels. The movement of the type wheels, due to this precisioning mechanism, is comparatively little, and is entirely compensated for by back lash in the gearing and other mechanism, hence may be accomplished without damage.

During the last half of the movement or rotation of the shaft 78, the type wheel is retracted from the work, the paper carriage and platen are advanced into position for the impression of the next character, and the key lever mechanism 121, 129, 90 and 96 is reset to prepare the keyboard for the impression of the next key by the operator. The resetting of the lever mechanism is accomplished by an enlarged eccentric portion 150 of the shaft 78, which overlies the key levers 129. Consequent upon the rotation of this eccentric portion of the shaft, the levers 129 are rocked counter-clockwise about their pivots 130, causing a projection 151 of any depressed lever 129 to engage its respective latch member 90 and move it out of engagement with its corresponding disc 91, permitting the spring 99 to return the bell crank 96, as well as the lever 65 (Fig. 3), thereby causing the rotation of the shaft to cease, following the completion of one revolution, as heretofore mentioned.

While the levers 129 are being returned to the position shown in Fig. 7, by the eccentric portion 150 of the shaft 78, the key lever 121 is likewise returned. As shown in Fig. 10, each key lever 121 is provided with a spring 132, which is interconnected between its respective key lever member 121 and a stationary frame member. When a key lever 121 is depressed, its associated lever 129 is moved to the position shown in Fig. 10, as heretofore described, whereupon the pin 128 maintains the lever 121 depressed by engagement with a surface 124 of such lever. When, however, the key lever 129 is reset or returned to the position shown in Fig. 7, the spring 132 returns the lever 121, bringing the recess or notch 127 into engagement with the pin 128 and latching the key levers 121 and 129 together.

The depression of a key through its control of the shaft 78 also controls the advance of the paper feed and platen carriage. As heretofore explained, the operation of the key serves to cause the shaft 78 to make one complete revolution. During the second half of this revolution, the paper carriage is advanced a distance which is determined by the width of the type, the imprint of which was caused by the operation of the selected key.

When a key is depressed, it unlatches a comb 152 supported by a yoke 153, which is pivotally mounted on a rock shaft 154, permitting this comb to rock about its shaft under the influence of gravity or a suitable spring (not shown). The rocking movement of the comb is limited by a plunger 155 which is actuated by the key lever depressed.

The comb-latching mechanism is best shown in Figs. 9 and 10, and comprises a latch 156 pivoted as at 157 to a block 158 carried by the frame 10. The nose of this latch is normally maintained in engagement with a lip 159, carried by the comb yoke 153, by a suitable spring 160. When a key is depressed, its key lever 121 strikes a rod 161 carried by the latch 156, permitting the latch to rock about its pivot and cause the comb to drop into contact with a plunger 155.

There is a plunger 155 for each key lever 121, and these plungers are slidably mounted in a block 162 and normally maintained out of the path of the comb by respective springs 163. Before a key lever 121 rocks the latch to release the comb, a projection 164 on such key lever cams its respective plunger, against the action of its spring 163, into the path of the comb.

The comb 152 is provided with a series of steps 165 of varying height. The arrangement of these steps is such that various plungers permit the comb to rock various angular distances, the distance depending upon which key is struck. The rocking movement of the yoke 153 is transmitted to a bell crank 166 by a pin 167 (Fig. 11). This bell crank 166 is pivoted to the shaft 154 and carries at its upper end, as shown in Fig. 13, a pawl 168, normally spring-pressed into engagement with a ratchet wheel 169. This ratchet wheel is drivingly mounted on the shaft 154, and hence the angular movement of the yoke 153 draws the pawl idly in a clockwise direction (Fig. 13) a distance determined by the height of the step 165 in the comb, which engaged the plunger 155 actuated by the key depressed. The movement of the ratchet, during this movement of the pawl, is prevented by a spring-pressed detent pawl 139 carried by a frame bracket 119.

This arrangement locks the comb against possible rebound actions which might affect the feeding of the worksheet W. The blocks 155 limit the downward movement of the comb, and as it takes a materially stronger force to move the ratchet 169, the ratchet and pawl 168 prevent rebounding, or movement of the comb in an upward direction. Reference is made to my copending application Serial No. 154,790, filed July 21, 1937, for claims on this feature.

Due to the force required to actuate the ratchet wheel 169, I utilize a power-operated mechanism for this purpose. During the last half of the rotation of the shaft 78, an eccentric crank 170, rigidly secured to the shaft 78, causes a connecting arm 171 to advance the ratchet an angular distance equivalent to the distance of movement of the pawl 166 just described. The connection between the crank arm and the bell crank 166 is the usual pin and slot arrangement, as shown in Fig. 13 at 172. The rotary movement of the ratchet 169 is imparted through a series of change speed gears 173 to the carriage progressing gear 46, heretofore mentioned, thus causing the advance of the paper carriage.

The comb is returned to its normal position by the connecting rod 177, permitting the spring 160 to cause the latch 156 to reengage the yoke 153. The rod 161, which is carried by the latch then postively returns the key levers 121 to their normal positions.

When the end of the typed line is reached, the operator returns the paper carriage to the position shown in Fig. 1, by swinging a lever 250 counter-clockwise. This lever is secured to a shaft 175, carried by a frame bracket 176. The lower end of this shaft is provided with a lever 177 which engages a lever 178 pivoted to the frame 10 at 179. This lever is connected by a link 180 with an arm 181 of a bell crank, which is pivoted to the frame 10 at 182 and the other arm 183 of which is connected to the detent pawl 139 by a link 184. Thus, the ratchet wheel is released consequent upon counter-clockwise movement of the lever 250.

Counter-clockwise movement of the lever 250 also connects the motor M with the ratchet wheel to operate the same in a reverse direction to return the paper carriage. The lever 178 is provided, as shown in Fig. 3, with a yoke 185 which is provided with pins 186 arranged to engage an annular groove in a clutch 190. Counter-clockwise movement of the lever 250 causes the clutch to be slid axially on its supporting shaft 191, bringing a clutch disc 192 into frictional driving engagement with a driving disc 193, which is carried by a shaft 194. This shaft carries a pulley 195, which is drivingly connected with a motor pulley 196 by a belt 197. When the carriage has been returned to its extreme left-hand position (Fig. 13), the friction driving connection between the clutch members 192 and 193 prevents damage to the parts.

The width of each type used on the type wheel bears a fixed relation to each other type used on the wheel. This width is commonly called the "set size". In designing the type, the width of the basic character of the font, namely, the upper case letter "M", is divided into eighteen equal parts and using one of these parts as a unit of measurement, the width of all of the remaining characters of the font is determined. For instance, the cap M is preferably three times as wide as either the lower case letters "j" or "f" and twice as wide as the lower case letters "a", "o", "g" or "x". Hence, if the upper case letter "M" is divided into eighteen units, the lower case letters "j" and "s" each comprise six units, while the lower case "a", "o", "g" and "x" will be nine units wide. Other letters will vary accordingly in width. The smallest letters, such as a period, will be five units wide.

The arrangement is such that the paper carriage is advanced the number of units equivalent to the "set size" of the letter last impressed on the work. For instance, if the letter "W" or a full length dash is impressed, it will be noted from Fig. 12 that a key lever 121 will cause a plunger 155 to contact with a step 165 of the comb 152 and depress the comb a distance sufficient to cause the ratchet wheel 169 to advance the paper carriage a distance equivalent to eighteen units. Thus, by varying the height of the steps 165 with which the plungers 155 coact, the paper carriage may be fed a distance required by the last character printed, such character, of course, being determined by the key depressed.

As heretofore mentioned, each type wheel 14 carries on its periphery two sets of type, T and t, the type t being arranged in one annular line or row and the type T being arranged in another annular row closely adjacent thereto. The keyboard, it will be noted from Fig. 1, is marked with upper case characters only. However, these may represent, for practical purposes, either upper or lower case. In the embodiment illustrated, I position the upper case row of characters at the right-hand side of the type wheel (Fig. 7) and the lower case characters on the left-hand side of the type wheels.

When the type wheel carriage 71 is moved to position a different row of type relative to the platen, as will be hereinafter more fully described, the precision stop 88 is also moved in the same direction by a pin 201 carried by the stop, which is in constant engagement with a yoke 202 carried by the carriage. This insures the proper positioning of each type regardless of which row of type is in the operating position. The arrangement of the stop 88 and its index wheel 101 is such that the type wheels are always stopped with the rearmost edge of each type on a line passing through the axis of the type wheels and through the point of tangency between the type wheels and the platen. Thus, I am enabled to advance the platen and paper feeding mechanism after each impression takes place.

A shift key 300, conveniently located on the keyboard, as illustrated in Fig. 1, is used to shift the type wheels, together with their inking mechanism to the left (Fig. 7), moving the left-hand row of type out of registration with the platen 12 and the next row of type into registration therewith. As shown in Fig. 6, the shift key 300 is mounted on a plunger 203, which is normally maintained in an uppermost position, by a suitable spring not shown. Consequent upon the depression of the key 300 a contactor 204 strikes a switch 205, causing the energization of a solenoid 206, which is connected with the switch by a conductor 207. The energization of the solenoid causes the core 208 thereof to rock a lever 209 (Figs. 1 and 6) in a clockwise direction. This lever, through the medium of a link 210, rocks a lever 211, which is secured to a shaft 212, rotatively mounted in the frame. The movement of the lever 211 is transmitted to the frame 71 which supports the type wheels and their inking mechanism, by a link 213, which is pivotally connected to the lever 211 by an adjustable link 214.

When the type wheels are moved to position the upper case characters in the printing position, the comb 155 is also moved from the full line position to the dotted line position, as indicated in Fig. 12, the reason for this being that the upper case characters are of a different width than the corresponding lower case characters. By moving the comb 155, I am able to provide a second series of steps thereon, which will be moved into position to coact with the respective character keys when the shift key is moved. This, of course, eliminates the necessity of providing both upper and lower case characters on the keyboard.

The comb 155 is moved from the full line to the dotted line position, by the shaft 212, heretofore mentioned, in connection with the type wheel shift mechanism. Rigidly secured to the shaft 212 is a shifter fork 215, arranged to engage the yoke 153 which supports the comb and move it toward the right, Fig. 11, against the action of a compression spring 216, which otherwise maintains the comb in its normal or left-hand position.

When it is desired to shift from one type wheel to another, that is, from say type of eight-point to another, or type of twelve-point width, the type wheels are moved toward the left in Fig. 7, so as to bring the middle or right-hand type wheel into the same relative position as the left-hand type wheel is shown. For this purpose I use the manually adjustable link 214, heretofore mentioned. As shown, this link interconnects the lever 211 with the link 213, to cause the type wheels to be moved to position the type wheels for either upper or lower case characters.

As shown in Fig. 1, the adjustable link is pivotally connected to the link 213, by a permanent pivot 220, and is provided with three openings 221, arranged to receive a pin or plunger 222, which may be adjustably positioned in any one of the openings by the operator, to secure the link 214 to the lever 211 in any of three positions, each of which is arranged to shift its respective type wheel into operative relationship relative to the platen.

When the shift is made from one type wheel to another, it follows that the paper feed carriage must be advanced a different distance for the twelve-point type than it was for an eight-point type. However, I find it desirable to make the ratio of the widths of the various characters relative to each other the same in every font, regardless of point size, and I arrange my mechanism so that the same comb will control the advance of the paper carriage. This is accomplished through the medium of the change speed gearing 193, heretofore mentioned.

The change speed gearing is best shown in Figs. 11, 12 and 15, and comprises a series of gears 230, which are keyed, as a unit, to the ratchet shaft 154, and which mesh respectively with individually rotatable gears 231, journalled on a shaft 232, carried by a frame bracket 233. Each of these gears has, as shown in Fig. 15, a keyway 234, arranged to receive a pin 235, which is carried by the shaft 232, consequent upon axial movement of the shaft, thereby drivingly connecting any one of the pairs of gears with such shaft. A spring-pressed ball 236 carried by the frame bracket 233 is arranged to enter annular recesses 237 in the shaft to maintain the pin 235 in an adjusted position. The shaft 232 is drivingly connected to the gear 46, by a gear 238, which is splined to the shaft 232 in any suitable manner, thus, even though the comb causes the ratchet to be advanced the unit of one width, the carriage may nevertheless be advanced the unit of an entirely different width to provide for the different points of the type.

I also provide my typewriting mechanism with a tabulator, which permits the paper carriage to be advanced to predetermined positions in a manner similar to the tabulator of the ordinary typewriter. Such advance takes place without the operation of the space or character keys and without making any impressions on the work sheet.

The tabulator mechanism is operated by the lever 250, heretofore described. However, in this instance, the lever is swung in a clockwise direction, causing a link 240 to swing a lever 241 (Fig. 5) about its pivot 242, for a purpose hereinafter to be described. Mounted on the link 240 is a pin 243 which engages a cam surface 244 on a lever 245 pivoted as at 246 to the frame 10. When the lever 240 is rocked in a clockwise direction, the pin 243 rocks the lever 246 against the action of a spring 247, bringing the nose 248 of the lever into the path of an adjustable stop 251 carried by a disc 252, which is secured to a shaft 253, carried by the frame 10.

The rocking of the lever 250 in a clockwise direction also through the clutch yoke 185 and other mechanism heretofore described, moves the clutch 190 along its shaft 191, bringing a clutch disc 192a (Fig. 6) into frictional driving engagement with the driving disc 193, heretofore described, thus, through the gears 254, 255 and 256, driving ratchet wheel shaft 154 in a direction to advance the paper carriage.

The advance of the paper carriage, by the tabulator mechanism, is stopped when a stop 251 engages the lever 245. The friction driving connection between the discs 192a and 193 prevents damage to the parts and eliminates the necessity of stopping the motor M. The disc 252, which carries the stops 251, is secured to its shaft 254 and is driven by a gear 260, which is drivingly secured to the disc and is in turn driven from the shaft 154 by the gear 256, heretofore described.

As heretofore mentioned, the printing mechanism is provided with three type wheels, each wheel carrying type of a different point size. For instance, the left-hand wheel (Figs. 6 and 7) may carry six-point type, the middle type wheel, eight-point type, and the right-hand type wheel, twelve-point type. In this arrangement, however, the corresponding type of each wheel are the same number of ems in width. The length of the em, however, varies for each point size of type. For instance, in six-point type an em is .083 inch in length, in eight-point type an em is .111 inch in length, while in twelve-point type the em is .166 inch in length. The type selecting mechanism is arranged to select type from any one of the type wheels, positioned above the platen. The paper feed mechanism is controlled by a change speed gearing 230, so as to advance the paper carriage the proper distance, dependent upon the point size of type used. The tabulator likewise is arranged so that when set at a predetermined number of ems, it will advance the paper carriage such number of ems, regardless of whether the ems be six, eight or twelve-point ems. This is accomplished by providing the tabulator disk 252 with a plurality of openings 252a, spaced equally distant from each other, and by providing the stops 251 with suitable pins 251a to occupy the desired opening, and thereby position the stop. The spacing of the openings 252a is such that when the gearing 230 is set for six-point type, the distance from one stop to a stop positioned in the next adjacent opening 252a will be equivalent to one em.

When the change speed gearing 230 is positioned for twelve-point type, the paper carriage will have to be advanced twice as far for one em as when using six-point type, as the disc 251 is geared to the ratchet shaft 254, and actuates the paper feed mechanism only through the gearing 230. Hence, if a stop 251 is positioned to advance the paper feed carriage twenty-five six-point ems, for instance, for six-point type, and the gearing is changed for twelve-point type, the stop is still positioned for twenty-five ems, but due to the gearing 230 the paper carriage will advance twice as far or twenty-five twelve-point ems, (the stop remaining in the same position on the tabulator disc).

Thus, it will be seen that the operator may use the tabulator mechanism without danger of errors, due to the shifting of the printing mechanism from one type wheel to another—that is, from one point size of type to another point size, and the tabulator when set for a predetermined number of ems, will advance the paper carriage, such predetermined number of ems, regardless of whether they be six-point ems, eight-point ems or twelve-point ems.

The lever 241, heretofore mentioned, operates to release a brake which normally engages the shaft 154 to prevent overthrow of the ratchet wheel 169 and consequent error in the advance of the paper carriage when the latter is actuated by the key mechanism, heretofore described. As shown in Fig. 5, this brake comprises a resilient friction brake shoe 270, which encircles a ring 271 carried by the ratchet wheel shaft 154. The opposite ends 272 of this shoe are normally drawn toward each other by a spring 273, bringing the shoe into frictional contact with the ring.

When the lever 250 is actuated, either to tabulate or reposition the paper carriage, as heretofore described, the brake 270 is released. As shown in Fig. 5, the lever 241, which is connected to the lever 250 by a link 240, is secured to its pivot shaft 275. This shaft is journalled in the shoe 270 and is provided with a pin 276, which, when the lever 250 is actuated, either to tabulate or return the paper carriage, cams the ends 272 of the shoe apart, thus releasing the brake. When the lever 250 is in its normal position, the pin 276 lies in recesses 277, formed in the ends of the shoe, thus causing the brake to become active.

I claim:

1. In a printing machine of the keyboard type, a plurality of keys each having key levers, actuating means connected to said key levers, means controlled by a manual operation of the keys to cause the first-named means to act on said key levers, a printing mechanism adapted to be selectively controlled by said key levers, a single rotation clutch, a power-actuated mechanism, means to couple said clutch with the power mechanism consequent upon the operation of a key, and means operative by said clutch to cause the printing action to take place and to subsequently cause the key levers to be returned to their original position.

2. In a printing machine a rotary type drum having a plurality of type around its periphery, a shaft connected to rotate said drum, power actuated means constantly acting to rotate said shaft, a friction driving connection interposed between said means and said shaft, a series of stops extending radially from said shaft, a keyboard having keys, a series of pivoted levers movable into the path of said stops, means whereby said levers are controlled by said keys to stop the rotation of the shaft with the drum in a predetermined position, a pivotally mounted support for said levers and movable consequent upon the engagement of one of said pivoted levers with a stop to initiate the printing operation.

3. In a printing machine of the keyboard type, a plurality of keys having pivoted key levers, springs to rock said levers about their pivots, a printing mechanism adapted to be selectively controlled by said rocking movement, a single rotation clutch, a power actuated mechanism, means to couple said clutch with the power mechanism consequent upon the operation of a key, and means common to all of said key levers and operated by said clutch to cause the key levers to be returned to their original positions.

4. In a printing machine of the keyboard type, a plurality of pivotally mounted keys, a key lever associated with each key but mounted for independent pivotal movement relative to said key, actuating means connected to said key levers, a latch between each key and key lever releasable by manual operation of a key, a printing mechanism adapted to be selectively controlled by said key levers, a single rotation clutch, a power actuated mechanism, means to couple said clutch with the power mechanism consequent upon the operation of a key, and a cam shaft common to all of said key levers operative by said clutch to restore said key levers and reengage the latches between the keys and the key levers.

5. In a printing machine, a keyboard, a movable impression member adapted to be controlled by the keyboard, said keyboard comprising a series of keys, each key having a key lever, a series of stops, means to frictionally drive said impression member, a driving member for said impression member, said driving member having elements adapted to be engaged by corresponding stops, means whereby the manual depression of any key causes the corresponding key lever to act on a stop and position such stop in the path of one of said elements to thereby stop the impression member in a predetermined position, and a power operated mechanism to return said key lever and said stop to their original positions.

CLIFTON CHISHOLM.